(12) United States Patent
Muca et al.

(10) Patent No.: US 11,922,754 B2
(45) Date of Patent: Mar. 5, 2024

(54) DISPENSING AND PROGRAMMING DEVICE AND METHODS FOR ELECTRONIC TRANSMISSION DEVICES

(71) Applicant: ATEQ, Les Clayes sous Bois (FR)

(72) Inventors: Ermald Muca, Lyon Township, MI (US); Cheng-Kuang Chen, Hacienda, CA (US); Grant Barnes, Canton, MI (US)

(73) Assignee: ATEQ, Les Clayes sous Bois (FR)

( * ) Notice: Subject to any disclaimer, the term of this patent is extended or adjusted under 35 U.S.C. 154(b) by 398 days.

(21) Appl. No.: 17/188,296

(22) Filed: Mar. 1, 2021

(65) Prior Publication Data

US 2021/0279995 A1    Sep. 9, 2021

Related U.S. Application Data

(60) Provisional application No. 62/984,356, filed on Mar. 3, 2020.

(51) Int. Cl.
*G07F 11/02* (2006.01)
*G01L 17/00* (2006.01)
*G01L 19/08* (2006.01)

(52) U.S. Cl.
CPC ............ *G07F 11/02* (2013.01); *G01L 17/00* (2013.01); *G01L 19/086* (2013.01)

(58) Field of Classification Search
USPC ........................................................ 700/233
See application file for complete search history.

(56) References Cited

U.S. PATENT DOCUMENTS

| | | | | |
|---|---|---|---|---|
| 5,205,436 | A * | 4/1993 | Savage | G07F 7/06 221/75 |
| 8,255,080 | B2 * | 8/2012 | Hirsh | G06Q 50/184 700/242 |
| 9,002,509 | B2 * | 4/2015 | Fletcher | G06K 13/103 700/231 |
| 2003/0034353 | A1 * | 2/2003 | Baack | G07F 11/54 221/2 |
| 2005/0216120 | A1 * | 9/2005 | Rosenberg | G07F 9/02 700/235 |
| 2009/0144149 | A1 * | 6/2009 | Sakakibara | G07F 17/0014 705/14.62 |
| 2014/0358705 | A1 | 12/2014 | Harrington et al. | |

(Continued)

FOREIGN PATENT DOCUMENTS

CN    102819898 B    7/2014

*Primary Examiner* — Timothy R Waggoner
(74) *Attorney, Agent, or Firm* — Young Basile Hanlon & MacFarlane, P.C.

(57) ABSTRACT

An automatic dispensing device for use in storing and selectively dispensing electronic transmission devices, for example tire pressure monitoring system (TPMS) tire sensors. The dispensing device assists a user in determining the proper transmission device to be dispensed and programs or configures the transmission device in the dispenser prior to dispensing the programmed or configured transmission device to the user. When used for TPMS tire sensors, the dispenser determines the type of TPMS sensor to be programmed, programs the sensor with the proper communication protocol, and dispenses the programmed or configured sensor to the user for installation in the vehicle wheel and tire.

20 Claims, 5 Drawing Sheets

(56) References Cited

U.S. PATENT DOCUMENTS

2015/0015390 A1* 1/2015 McIntyre ............ B60C 23/0472
340/447
2020/0009925 A1* 1/2020 Zhang ................. B60C 23/0479
2021/0304547 A1* 9/2021 Hasty ...................... G07F 9/009

* cited by examiner

DISPENSING AND PROGRAMMING DEVICE AND METHODS FOR ELECTRONIC TRANSMISSION DEVICES

CROSS-REFERENCE TO RELATED APPLICATIONS

This invention claims priority benefit to U.S. Provisional Patent Application Ser. No. 62/984,356 filed Mar. 3, 2020 the entire contents of which is incorporated by reference.

TECHNICAL FIELD

This disclosure generally relates to the field of transmission devices, such as sensors intended to communicate measurements made to third party devices, and more particularly the way in which they are stored and dispensed.

BACKGROUND

In 2007, the United States federal laws implemented and required most passenger vehicles to include a tire pressure monitoring system (TPMS) to monitor and alert drivers of low tire pressure which degrades vehicle efficiency, performance and improves safety.

Conventional TPM systems include a tire sensor installed in the wheel, often the valve stem of pneumatic vehicle tire. These sensors are configured to monitor several conditions of the tire including: tire air pressure, tire temperature, wheel rotation speed and other conditions. The TPMS tire sensors are configured to receive electronic signals and send electronic signals wirelessly from inside the wheel to an electronic control unit or module (ECU) in the vehicle which typically is connected to alert signals in the instrument panel in the interior of the passenger compartment. If a wheel sensor detects a tire pressure or other condition in a tire that is above or below a predetermined level, the sensor transmits a signal that is received by the ECU and an audio/visual indication is triggered to alert the driver to the condition.

Typical TPMS tire sensors generally include a small battery, a circuit board with communication antennas or coils (receive and transmit), an air pressure sensor, a temperature sensor, a rotation detection device or accelerometer, a programmable controller, a data memory storage, and other information depending on the TPM system and sensor capabilities. Each TPMS tire sensor includes a sensor specific identification (ID) is typically in the form of an alpha-numeric code so the vehicle ECU can distinguish between the typical four tires on a passenger vehicle and further alert a driver which vehicle tire may be experiencing conditions outside of an acceptable range.

Conventional TPMS sensors in the tires are typically powered by an internal battery. To increase sensor battery life, the TPMS sensors are often in a "sleep" mode, not actively transmitting tire data. When a reading of the TPMS sensor is needed, a TPMS tool is needed to "trigger" or awaken the sensor to induce the TPMS sensor to emit the measured tire data and sensor ID. This triggering of TPMS sensors is often used in vehicle service garages where technicians as part of a routine data or safety check of vehicles, will check the conditions of the tires through triggering the TPMS tire sensors with a TPMS trigger tool. Typical TPMS tire sensors are programmed to be triggered through receipt of a low frequency (LF) signal, typically 125 kilohertz (kHz). The tire sensor then wirelessly emits a data signal, typically at 315 or 433 megahertz (MHz) containing the measured data from the tire. Conventional, sophisticated TPMS tools will decode the received tire sensor signal, retrieve from tool memory the proper protocol to communicate with the particular vehicle ECU, and wirelessly send a recoded data signal to the vehicle ECU to reprogram or relearn the ECU with the new TPMS sensor information.

It is sometimes necessary to change the tires and/or the sensors housed in them, especially when the sensor is defective or the battery power is depleted. Other examples impacting the TPM system include when the tires are rotated for wear, or snow tires are installed, which changes the location of the TPMS sensors or the new tires include new sensors. Thus, when a user brings his/her motor vehicle to the garage, the garage must determine the type of pressure sensor housed in the tires.

There are many different commercial manufacturers of TPMS sensors. Each sensor manufacturer may use a certain signal communication protocol required to communicate with the TPMS sensor in order for TPMS sensor to awaken and emit the sensor ID and measured data. Communication protocols means a set of rules (e.g. how the wireless data signal is encoded) and procedures for transmitting and receiving data between the TPMS sensor and another device, for example a TPMS trigger tool.

There are also many different vehicle original equipment manufacturers (OEMs) which include TPMS. Indeed, the same vehicle model, manufactured in the same year, may have different types of TPMS sensors, i.e. sensors with different communication protocols. For example, the type of sensor and its communication protocol can be retrieved by the VIN code of the vehicle, but it can be time consuming and tedious to search for this information. Furthermore, if the tires are not the original ones, it may not be possible to readily find the type of sensor currently fitted in the tires using the vehicle information. Combined with the many TPMS sensor manufacturers, there are hundreds of different combinations of vehicle manufactures and TPMS sensors making it difficult and time consuming for service garage technicians to identify what TPMS sensors are on a particular vehicle and the proper communication protocol required to communicate with the vehicle TPMS sensors.

Typically, in the case of tire air pressure sensors for motor vehicles, the TPMS sensors are stored and/or used in industrial environments or vehicle garages. These environments are particularly hostile, and the sensors may be exposed to chemicals, heat, humidity, vibrational shocks, electromagnetic interference, or any combination thereof. Moreover, these sensors are typically freely accessible and can be easily stolen or misplaced. Accordingly, it would be beneficial to have a device to securely store and dispense the sensors when needed.

SUMMARY

Several methods and devices for programming and dispensing electronic transmission devices are disclosed. In one aspect, a dispensing device may include a storage space for the transmission devices, a module for programming the transmission devices, and a delivery tray. The delivery tray may be configured to dispense the programmed transmission devices. The dispensing device may include an electromagnetically shielded cavity. The dispensing device may include a reading (or scanning) module. The reading module may be configured to read (or scan) the transmission devices to obtain information associated with the transmission devices. The dispensing device may include a human-machine interface. The dispensing device may include an accessory storage space. The dispensing device may include a fastener configured to attach the dispensing device to a wall or a floor. The dispensing device may include a printer. The dispensing device may include a financial payment terminal. The dispensing device may include a card reader. The dispensing device may include a keyboard. The dispensing device may include an optical reader (or scanner). The dispensing device may include an onboard diagnostic device or module (OBD). The dispensing device may include a database stored in a data memory storage device that includes information associated with the electronic transmission devices. The dispensing device may include a communication module configured to communicate with a third party (or peripheral) device. The dispensing device may include an electronic unit comprising a microprocessor, a data memory storage device, or both. The dispensing device may include a module configured to clone (or duplicate) a transmission device.

In one aspect, a method for dispensing an electronic transmission device may include receiving vehicle information. The method may include determining a transmission device type. The method may include determining a transmission device protocol. The method may include retrieving a transmission device. The transmission device may be retrieved based on the determined transmission device type, the determined transmission device protocol, or both. The method may include placing the retrieved transmission device in a shielded cavity. The method may include transmitting a signal into the shielded cavity to program the transmission device. The method may include dispensing the programmed transmission device.

In one or more aspects, retrieving the transmission device may include controlling an actuator, for example, a chute, a conveyor system, a robotic arm, or any combination thereof. In one or more aspects, the signal, operable to program the transmission device, may be transmitted as an electromagnetic wave at a frequency of approximately 125 KHz or between 315 MHz and 434 MHz. In one or more aspects, dispensing the programmed sensor may include transporting the programmed transmission device to a delivery tray.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The embodiments disclosed herein include dispensing and programming devices and methods for electronic transmission devices. The devices may be configured or operable to communicate with Tire Pressure Monitoring System (TPMS) tire air pressure sensors intended to be accommodated (or installed) in the tires of a motor vehicle, such sensors generally being associated with the computer of a motor vehicle to which the sensors are configured to transmit data. The tire air pressure sensor devices may be configured or operable to communicate via a radio frequency transmitter, Bluetooth, WiFi, near field communication (NFC), ultra-wideband (UWB) communication, or similar communication protocols known by those skilled in the art. The motor vehicle may include automobiles, motorcycles, aviation vehicles, construction vehicles, and personal mobility vehicles including, but not limited to, mopeds and bicycles. It should be noted that the examples disclosed herein are described in terms of a TPMS pressure sensor for simplicity. It is understood that these examples may extend to any type of electronic transmission device including, but not limited to, internal tire air pressure sensors, temperature sensors, or the like, which may need to be programmed or configured prior to being used and/or mounted in a motor vehicle or other vehicles or transportation devices.

In the embodiments disclosed herein, programming an electronic transmission device may refer to programming the electronic transmission device during the dispensing process inside the inventive device. For example, sending a data signal to the sensor positioned inside the inventive device wherein the sensor receives and internally stores in a sensor memory device, the program, data and/or instructions to operate and/or communicate with the particular vehicle electronic control unit (ECU), other onboard vehicle system, or devices external to the sensor, for example a hand-held TPMS tool or sensor trigger device. As used herein, programming an electronic transfer device described above further includes, but is not limited to, cloning or duplicating a programmed electronic transmission device (all collectively referred to as "programming" an electronic transmission device). In one example of cloning a TPMS tire air pressure sensor, information is read or received from a to be replaced tire sensor and transferred to a new programmable TPMS sensor which thereafter then serves as a duplicate or clone of the to be replaced sensor. Electronic transmission devices other than TPMS sensors may be programmed, or be subject to programming as described herein, to suit the particular application as known by those skilled in the art.

Figure 1:
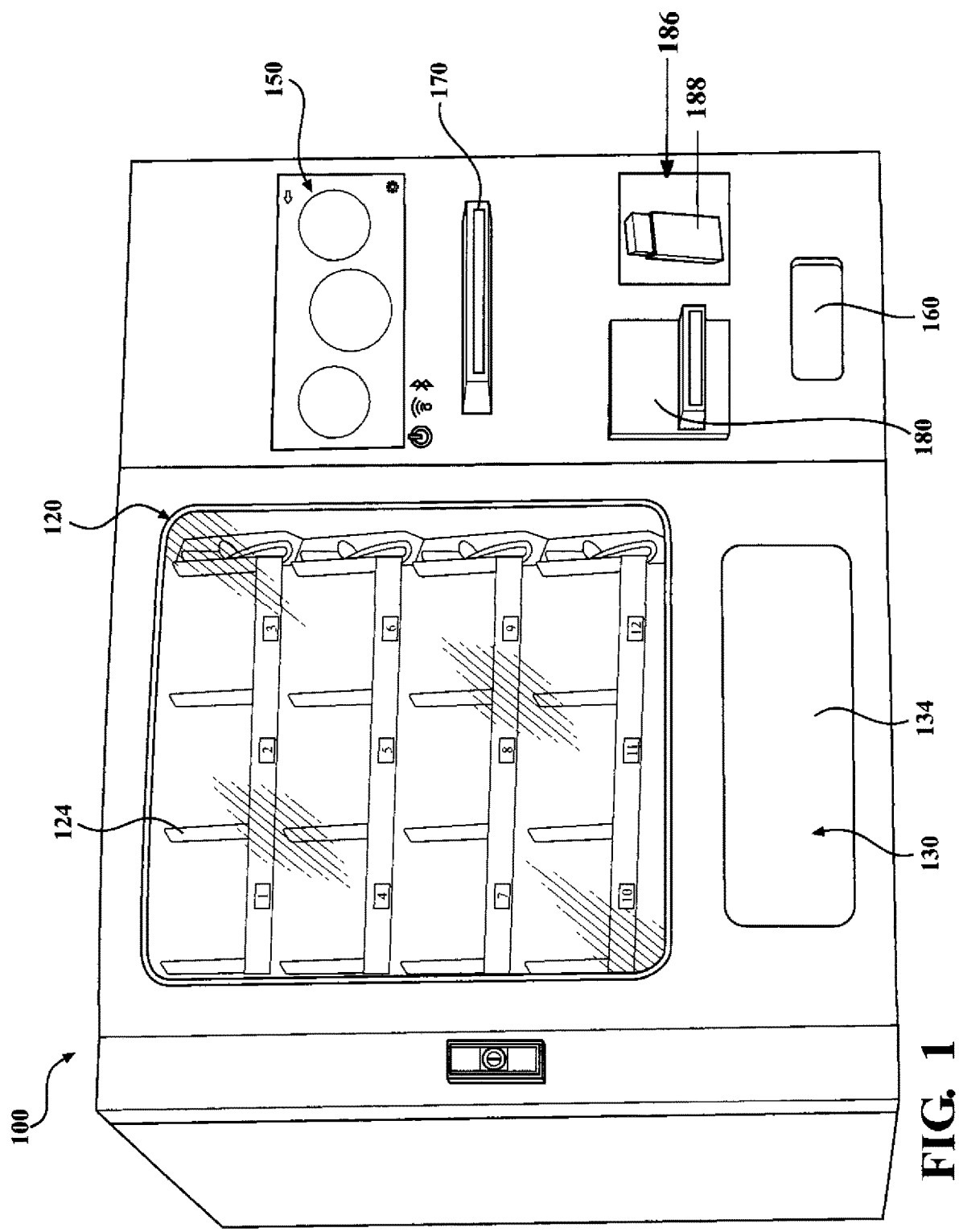
FIG. 1 is perspective view of one example of a dispensing device configured to dispense transmission devices.
Figure 1A:
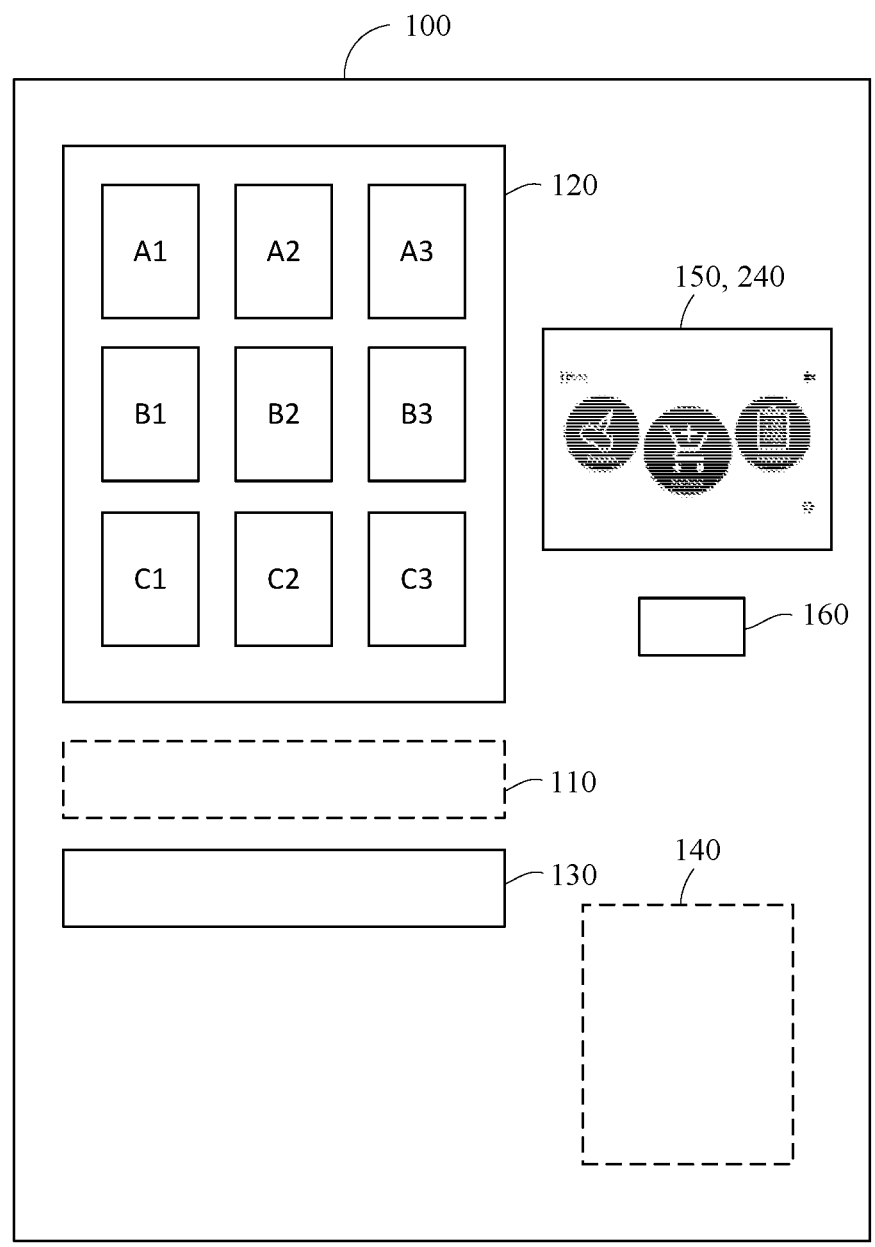
FIG. 1A is a schematic diagram of the example of the dispensing device of FIG. 1.

FIGS. 1, 1A, show an example of a dispensing device 100 configured (or operable as used throughout the specification) to dispense electronic transmission devices, for example a TPMS sensor (not shown) operable to monitor and communicate one or more conditions in the interior of a vehicle pneumatic tire as described above.

In one example, the dispensing device 100 may include a shielded cavity 110. The shielded cavity 110 is configured to receive a transmission device prior to programming the transmission device. The exemplary shielded cavity 110 is electromagnetically shielded to prevent inadvertent programming of transmission devices outside of the shielded cavity 110. The shielded cavity 110 may include a shielded door (not shown) that is configured to selectively open to receive a transmission device and close prior to programming of the transmission device. The example shielded cavity 110 may include a shielded floor (not shown) configured to selectively open to dispense a programmed transmission device and close prior to programming of the transmission device. In some embodiments, the shielded cavity 110 may be configured or operable to sealingly pressurize the interior of the shielded cavity 110 relative to other areas internal to the dispensing device and/or the surrounding atmosphere and include a separate pressure sensor (not shown). Pressurization of the shielded cavity 110 may be variably controlled, and the separate pressure sensor may be used to verify a pressure value as measured by the programmed transmission device positioned in the pressurized shielded cavity 110. Devices or components suitable for sealing and/or pressurizing the cavity 110 as described, for example a pressurized air source, air pressure valves, a controller, and/or air conduits to and from the shielded cavity 110 (all not shown), may be included in the dispensing device 100 as known by those skilled in the art.

As shown in exemplary FIGS. 1 and 1A, the dispensing device 100 may include a window 120 through which a user may view items, for example various different transmission devices, in the dispensing device 100. The window 120 is optional as some embodiments may be configured without a window such that the items are not visible to a user. The items to be dispensed may be located on shelves or bays 124 shown as A1-C3 shown in FIG. 1A (nine bays 124 shown in FIG. 1A, 12 bays shown in FIG. 1). Different numbers, sizes, shapes, configurations and orientations of bays 124 may be used to suit the particular application and/or transmission devices as known by those skilled in the art.

Each shelf or bay 124 may include an actuator (not shown) configured to transfer or transport an item, such as a transmission device, from a bay 124 into the shielded cavity 110. In some embodiments, an item may be transported and placed into the shielded cavity 110 using one or more selectively actuated chutes, conveyor systems, robotic arms, or any combination thereof.

The exemplary dispensing device 100 includes a dispensing tray 130. The dispensing tray 130 may be configured to receive the programmed transmission device from the shielded cavity 110, directly from a bay 124, or from another area of the dispensing device 100. In some embodiments as best seen in FIG. 1, the dispensing tray 130 may include a door 134 that is configured or operable to be selectively opened by a user to retrieve the programmed transmission device transferred from the shielded cavity 110 by an actuator described above or another mechanism (not shown). In some embodiments, the door 134 may be configured to open automatically after a predetermined time, for example following completion of the transmission device programming in the shielded cavity 110 as determined by one or more sensors (not shown), processor 220, and/or controller 210 as further described below.

Figure 2:
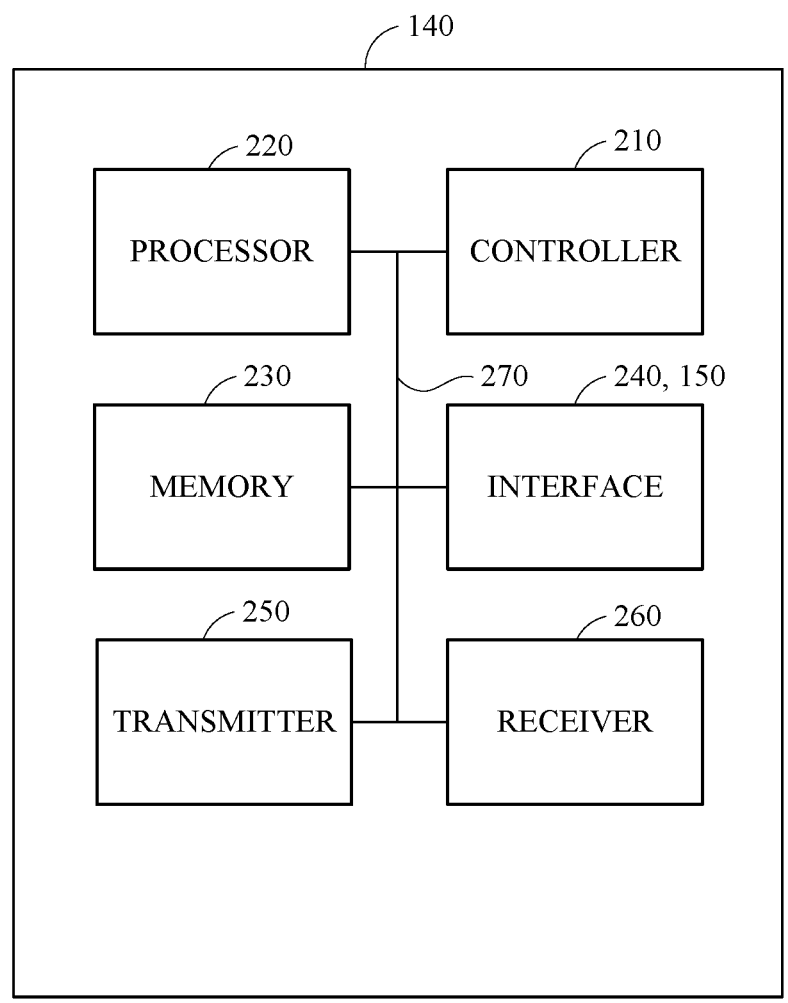
FIG. 2 is a schematic block diagram of an example of a processing apparatus for the example shown in FIG. 1.

Referring to FIGS. 1A and 2, the exemplary dispensing device 100 includes a processing apparatus 140. The exemplary processing apparatus 140 may be a combination of hardware and software. The processing apparatus 140 is configured to control the input or commands by a user through the dispensing device user interface 150, dispensing operations, programming operations, payment operations, or any combination thereof.

As best seen in FIGS. 1 and 1A, the exemplary dispensing device 100 may include a user interface 150. The user interface 150 may be a human-machine interface (HMI) that allows a user to operate the dispensing device 100 by indicating via this interface the desired transmission device(s), programming operations, configuration operations, or any combination thereof, that the dispensing device 100 may perform on the selected transmission devices prior to dispensing the transmission device. In one example, the user interface 150 may include a keypad and a display. In some embodiments, the user interface 150 may be an interactive touchscreen display or voice activated. Other user interfaces 150 features, functions and operations may be used to suit the particular application as known by those skilled in the art.

The exemplary dispensing device 100 may include an identification unit 160. The identification unit 160 may be an optical scanner that is configured to read bar codes, quick response (QR) codes, vehicle identification number (VIN) codes, or any other type of visual code as known by those skilled in the art. The identification unit 160 may be configured to utilize smart tags, RFID tags, or have optical image recognition capabilities.

In one or more embodiments, the dispensing device 100 may include additional storage space or areas to position and temporarily store accessories related to the transmission devices (not shown). For example, the accessories may include, and are not limited to, a maintenance or service kit for the transmission devices. The exemplary maintenance or service kit may allow an operator to obtain additional elements or parts for the assembly and/or maintenance of the selected transmission device. In one example, the maintenance or service kit may include tools, for example commonly used or specialized wrenches, screw drivers or other tools that are useful in servicing or installing the particular transmission devices included in the dispensing device 100, for example TPMS sensor transmission devices. In another example, commonly used or specialized mechanical fasteners, seals, adhesives, lubricants, valve stems, or other components useful to install the transmission devices, for example TPMS sensors, may be included.

In one or more exemplary embodiments, the dispensing device 100 may include one or more fasteners or mounting devices. The one or more fasteners may be configured to allow the dispensing device 100 to be attached to an object such as a wall or a floor.

In one or more exemplary embodiments, the dispensing device 100 may include a printer 170. The printer may be used to print invoices, data sheets, assembly instructions, operation instructions, troubleshooting instructions, or any combination thereof. The printed information, for example assembly instructions, may be prestored in the processing apparatus 140 data memory storage device and be automatically actuated by the controller 210 based on selection of the transmission device, or through user input from the user interface 150.

Some exemplary embodiments may include a payment terminal 180. The payment terminal 180 may be a card reader. Alternate or supplement payment terminal features may include a device to collect currency, dispense currency (i.e., change), or both. The payment terminal 180 may be configured to facilitate the purchase of a transmission device, for example in coordination with user input of a selection of the transmission device through the user interface 150. Information or data relating to the purchase, for example the purchase price, or payment may be prestored in the processing apparatus 140 data memory storage device 230 and executed by the processor and/or controller 210 as known by those skilled in the art. This stored information or data may be added, deleted or updated by any methods as known by those skilled in the art. The payment terminal 180 may be configured or operable to initiate the programming of the transmission device based on a confirmation of payment as determined or verified by the processing apparatus 140.

Some exemplary embodiments may include a visual status indicator, such as an light emitting diode (LED) indicator configured to indicate a power status, a connection status, an error status, a signal strength (none shown), or any combination thereof.

FIG. 2 is a block diagram of the exemplary processing apparatus 140 shown in FIG. 1. The processing apparatus 140 includes a controller 210, a processor 220, a data memory storage device 230, an interface 240 (for example user interface 150), an electronic signal transmitter 250, and an electronic signal receiver 260. In some exemplary embodiments, the transmitter 250 and the receiver 260 may comprise a single communications unit. The communications unit may be configured to retrieve and/or send data, for example, information relating to a transmission device, to a remote computer server or a third party peripheral or other separate device. The communications unit may be wired or wireless, and may be configured to transmit and receive via radio frequency, Bluetooth, WiFi, NFC, UWB communication, or the like as known by those skilled in the art. The controller 210, processor 220, memory 230, interface 240, transmitter 250, and receiver 260 may each be in electrical communication with each other, for example, via a bus 270.

The controller 210 may be configured to control the dispensing operations, programming operations, payment operations, printing operations, processing or memory updates, or any combination thereof. For example, the controller 210 may control an actuator configured to transfer and dispense an item, such as a transmission device, from a selected or determined bay 124 into the shielded cavity 110 shown in FIG. 1A. In some exemplary embodiments, the controller 210 may control one or more selectively actuated chutes, conveyor systems, robotic arms, or any combination thereof, to dispense the item and/or transfer or transport the item from a bay 24 to the shielded cavity 110.

Figure 3:
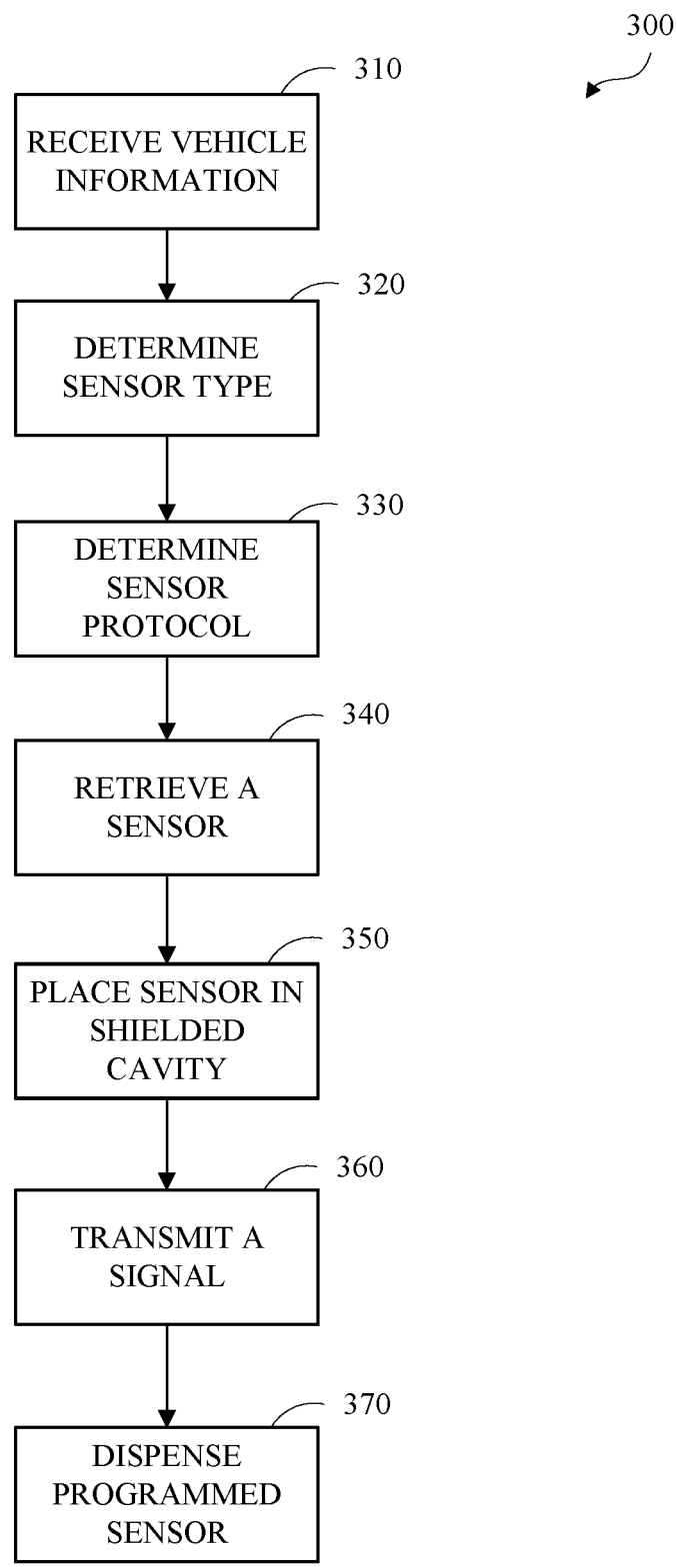
FIG. 3 is a flow diagram of an example of a method for programming and dispensing an electronic transmission device.

The processor 220 may be configured to perform one or more steps of the method 300 shown in FIG. 3. The processor 220 may be configured to program an electronic transmission device, for example a TPMS tire pressure sensor. The processor 220 may be configured to program the electronic transmission device based on a vehicle make, a vehicle model, a vehicle model year, a tire make, a tire model, a tire size, type of TPMS sensor, or any combination thereof.

The memory 230 may be configured to store one or more computer-readable programs, instructions, executable files, operating systems, or any combination thereof. In use for transmission devices in the form of TPMS tire sensors, the memory 230 may be configured to store a database that includes the vehicle and/or tire information described above, as well as TPMS sensor devices and associated sensor protocols for programming the particular TPMS sensors. The database may be updated via direct link or by using a data carrier, such as a flash drive, a compact disk, through hard wire connection or wireless communication with a remote computer or server, or the like as known by those skilled in the art. The memory 230 may be configured to store a history of the actions carried out by the dispensing device 100, such as the quantity of transmission devices dispensed, the types of transmission devices dispensed, the programming protocols of the transmission devices dispensed, or any combination thereof. The exemplary processor 220 and/or controller 210 retrieve and send information and data from and to the memory 230 to suit the particular operation or function of device 100 as known by those skilled in the art. Other examples of devices and methods of controls and communication that may be used for device 100 may be found in US Patent Application Publication No. US 2014/0358705 filed Jan. 23, 2014 the entire contents of which is incorporated by reference.

The interface 240 may be configured or operable to receive instructions and/or signals from the processor 220, the user interface 150 shown in FIGS. 1 and 1A, a third party device such as a vehicle onboard diagnostic device (OBD) module or OBD dongle device, or any combination thereof. In one example, an OBD dongle device is removably connectable to a vehicle OBD port and includes data memory storage to receive and store information or data received from the vehicle ECU through the vehicle OBD port or connector. In one example, the OBD dongle device wirelessly transmits the received vehicle ECU information to the device 100 interface 240 and/or receiver 260. In one example of device 100 shown in FIG. 1, an accessible compartment 186 is used to removably store an OBD dongle device 188 which may be used to connect to a vehicle OBD port and wirelessly transmit vehicle information for receipt by device 100 processing apparatus 140 to assist in programming the electronic transmission device, for example a TPMS tire sensor, as generally described herein.

The processor 220 may be configured or operable to convert the instructions received from the interface 240 and/or receiver 260 to predetermined and/or prestored instructions in the memory 230 that may be understood by the controller 210. In another example, a user may manually input vehicle and/or sensor information through the interface 240, 150, for example through a keyboard or interface touch pad, for receipt and processing by the processing apparatus 140 as generally described herein. In another example, device 100 may read or scan information through the identification unit 160 described above in communication with the processing apparatus 140. In another example, a communication cable may be selectively and temporarily connected to the vehicle OBD port and the device 100 interface 240 in the form of a socket or receptacle (not shown) in communication with the processing apparatus 140.

The transmitter 250 and the receiver 260 may be configured or operable to communicate with the interface 240, 150. The receiver 260 may receive a sensor protocol from the user interface 150 via the interface 240. In one example, the TPMS sensor protocol to be programmed into a new TPMS sensor in the device 100, may be received by the receiver 260 in one or more of the manners described above for receiving instructions by the interface 240. In one example, the processor 220 may obtain the sensor protocol from the receiver 260 and instruct the transmitter 250 to transmit a signal to program a transmission device, for example a TPMS sensor. The signal may include the sensor protocol which is received and stored in the TPMS sensor. For example, the sensor protocol may be embedded in the signal. The transmitter 250 and the receiver 260 may be configured or operable to transmit and receive electromagnetic waves, for example, at frequencies approximately 125 KHz and/or between 315 MHz and 434 MHz. Other forms of signals, and different frequencies, may be used to suit the particular transmission device and application as known by those skilled in the art.

In an alternate example of receiving or determining a transmission device communication and/or operation protocol, a user may manually input through the interface 150 vehicle information including the VIN, make, model and/or year of the vehicle which thereafter is used by the processing apparatus 140 to determine the proper communication protocol for the TPMS sensor which is thereafter programmed as generally described herein. In another example, through menus or prompts visually displayed on the device 150 interface, a user can manually or verbally input or select the proper transmission device communication protocol which is then used to program the transmission device as generally described herein. Alternately, the vehicle information and/or transmission device communication protocol is received from the vehicle OBD or OBD dongle device as described above. In one example of device 100, the device 100 includes an OBD communication device or module (not shown) as part of the processing apparatus 140, for example as part of, or in communication with, receiver 260 and/or interface 240. The device 100 OBD communication device is operable to receive vehicle information, including but not limited to TPMS sensor communication protocols, from the vehicle electronic control unit (ECU). In one example, this information is received by the device 100 OBD communication device or module wirelessly from an OBD dongle connected to the vehicle OBD port as generally described herein. Other methods and devices for device 100 to receive the described vehicle information known by those skilled in the art may be used.

In another example, the device 100 processing apparatus 140 may receive the transmission device protocol, or other data, from a separate and independent TPMS tool which may be used to trigger and/or receive information from the TPMS tire sensor and/or vehicle. The TPMS tool may transmit such information to the device 100 wirelessly or through a communication cable connectable to the device 100 as described above. Other methods of the device 100 processing apparatus 140 receiving the transmission device protocol or other data for use in programming a transmission device as described herein may be used as known by those skilled in the art.

In some embodiments, the transmitter 250 may include a programming and/or configuration module or function and the receiver 260 may include a reading or scanning module or function that may be used to clone or duplicate transmission devices, for example TPMS sensors. For example, a to be replaced (worn or defective) TPMS sensor may be placed by a user into the shielded cavity 110 shown in FIG. 1A to be read or scanned by the reading module (for example by a TPMS sensor trigger signal generated by the transmitter 250). In one example, the emitted TPMS sensor-specific data (sensor unique identifier, etc.) from the sensor may be received by the receiver 260 and stored in memory 230. The to be replaced TPMS sensor is then removed from the shielded cavity 110 and a new programmable TPMS sensor is retrieved from a bay 124 and transferred to the shielded cavity 110 in a manner described above. The stored in memory received TPMS sensor-specific data may then be retrieved from the memory 230, and through emissions from the programming and/or configuration module (for example transmitter 250), used to program or clone the new sensor, which then has the same unique TPMS sensor identifier as the previously read to be replaced sensor. In an alternate example, the reading module may read or scan other indicia on the to be replaced TPMS sensor, for example a bar code on the exterior of the sensor, providing the unique sensor ID or other information needed to program the new sensor. Other devices, methods and/or processes in device 100 may be used to configure or clone a transmission device, for example a TPMS sensor, as known by those skilled in the art.

In one example described above where device 100 functions to selectively pressurize the shielded cavity 110, the reading module may be used to retrieve pressure values measured by a programmed transmission device, for example a TPMS sensor, to be compared with the measured or monitored pressure of the shielded cavity 110 of FIG. 1. The comparison of the pressure measured by the transmission device to the measured pressure of the shielded cavity, may be done by the processing apparatus and then displayed through the user interface, printer, or other visual or audible signal to the user.

FIG. 3 is a flow diagram of an exemplary method 300 for programming and dispensing an electronic transmission device, for example a TPMS sensor. The method 300 may be performed by the dispensing device 100 shown in FIGS. 1, 1A. One or more steps of the method 300 may be performed by the processing apparatus 140, for example processor 220 shown in FIG. 2.

The exemplary method 300 includes receiving 310 vehicle information. The vehicle information may be received via the user interface 150 shown in FIG. 1 or via a third party device such as an OBD dongle. The vehicle information may include a vehicle make, a vehicle model, a vehicle model year, a vehicle identification number (VIN), a tire make, a tire model, a tire size, or any combination thereof.

The method 300 includes determining 320 a TPMS sensor type. The sensor type may be determined based on the vehicle information. The sensor type may be determined using a database. In a case of configuring or cloning a sensor, the sensor type may be determined based on a signal received from the sensor or through reading or scanning indicia on the exterior of the sensor, for example a bar code. The signal may contain a sensor unique identification, including a sensor type, a serial number, a sensor make, a sensor protocol, or any combination thereof.

The method 300 includes determining 330 a TPMS sensor protocol. The sensor protocol may be determined based on the received vehicle information. The sensor protocol may be determined using a database. As explained above, this database information may be prestored in the device 100 memory 230. In the case of configuring or cloning a sensor, the sensor protocol may be determined based on the signal received from the sensor, for example through the reading module.

The method 300 includes identifying and retrieving 340 a suitable TPMS sensor. Identification of a suitable TPMS sensor is based on the determined sensor type and the determined sensor protocol. Retrieving 340 the sensor may include controlling an actuator, for example, a selectively actuated chute, a conveyor system, or a robotic arm, or any combination thereof, to select one or more suitable or acceptable sensors from a predetermined bay 124 or shelf A1-C3 as shown in FIGS. 1, 1A.

The exemplary method 300 includes placing 350 the selected sensor in a shielded cavity, such as shielded cavity 110 shown in FIG. 1A.

In one example described above, the method 300 step 350 may include reading or scanning a to be replaced sensor in the shielded cavity that is being configured or cloned. The information read from the to be replaced sensor in the shielded cavity may include a sensor identifier, a sensor model, a sensor protocol, one or more technical features of the sensor, or any combination thereof.

The exemplary method 300 may include transmitting 360 a signal. The signal may be transmitted by device 100, for example transmitter 250, to program a transmission device, for example, a TPMS sensor. The signal may include the sensor protocol. For example, the sensor protocol may be embedded in the signal. The signal may be transmitted as an electromagnetic wave at such frequencies as approximately, for example, 125 KHz and/or between 315 MHz and 434 MHz.

In another example described above, the method 300 may include a step of testing a TPMS sensor in the shielded cavity 110, for example pressurizing shielded cavity 110, to ensure that the sensor is working properly prior to dispensing the sensor for user retrieval. In an alternate example, the shielded cavity 110, or other area of device 100, could be heated and the TPMS sensor temperature sensor could be read and checked against the measured temperature of the device 100 heated area.

The exemplary method 300 may include dispensing 370 the programmed TPMS sensor. Dispensing 370 the programmed sensor may include transporting the programmed sensor from the shielded cavity 110 to the delivery tray 130 shown in FIGS. 1, 1A. Dispensing 370 the programmed sensor may include controlling an actuator, for example a chute, a conveyor system, a robotic arm, or any combination thereof, to transport the programmed sensor from the shielded cavity 110 to the dispensing tray 130. It is understood that additional steps, or removal of steps, or reordering of steps, may be used to suit the particular application as known by those skilled in the art.

Figure 4:
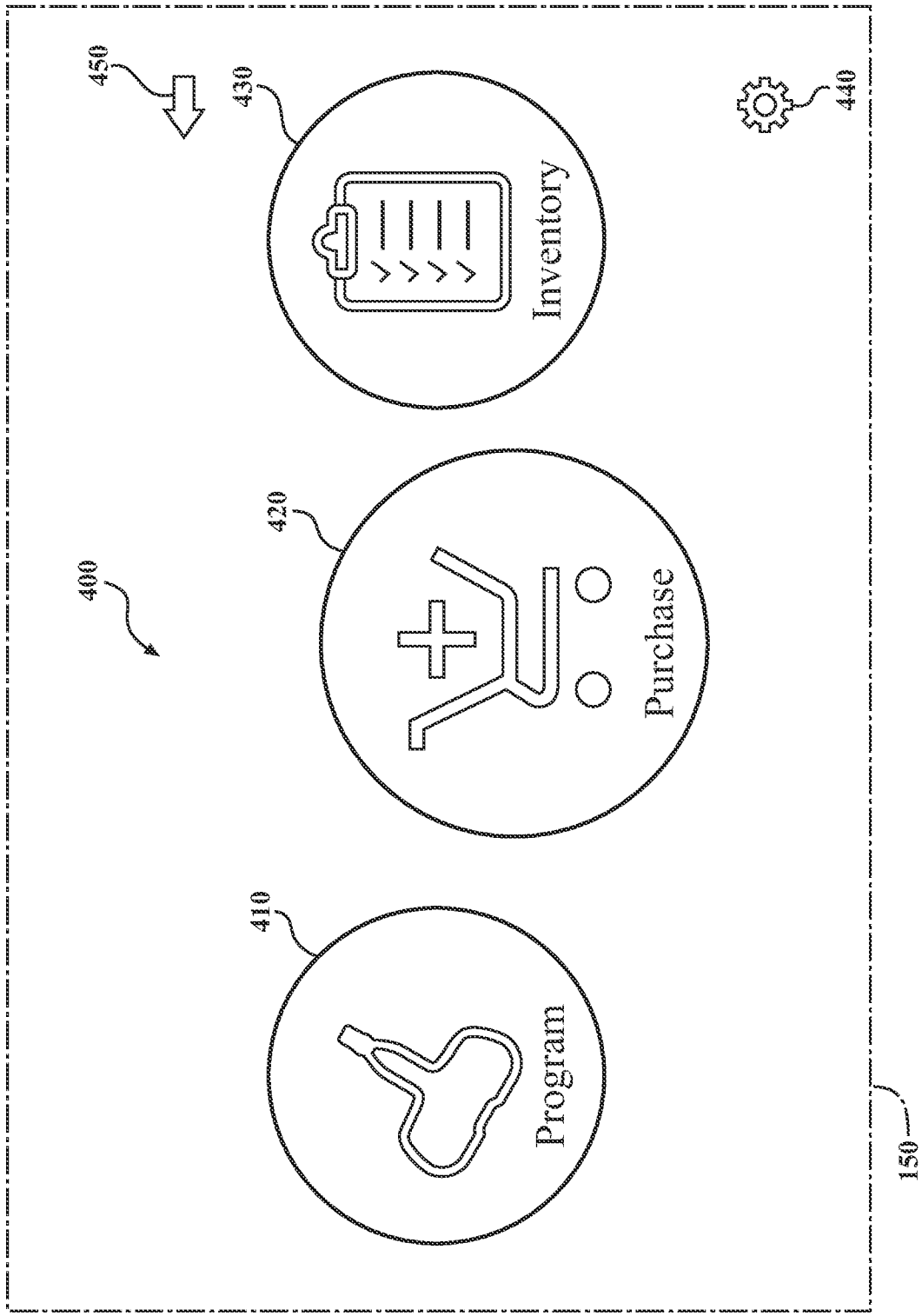
FIG. 4 is a diagram of an example user interface display for the example shown in FIG. 1.

FIG. 4 is a diagram of an example user interface display 400. The user interface display 400 may be displayed on the user interface 150 shown in FIGS. 1, 1A. As shown in FIG. 4, the user interface display 400 may include a program module 410, a purchase module 420, an inventory module 430, a settings module 440, and a return module 450.

The program module 410 may be selected to enter one or more parameters to program a transmission device, for example a TPMS sensor. The one or more parameters may include vehicle information, such as, for example, a vehicle make, a vehicle model, a vehicle model year, VIN, a tire make, a tire model, a tire size, or any combination thereof. The purchase module 420 may be selected to enter payment information. The inventory module 430 may be selected to display an inventory of the transmission devices stored in the dispensing device 100 shown in FIGS. 1, 1A. The settings module 440 may be selected to display a settings menu to allow the user to configure one or more settings of the dispensing device 100. The return module 450 may be selected to return to a previous menu. It is understood that additional modules, features and functions for device 100 may be included in the interface display 400 to suit the particular application, transmission device, and performance specifications as known by those skilled in the art.

While the invention has been described in connection with certain embodiments, it is to be understood that the invention is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law. One or more elements of the embodiments disclosed may be combined with one or more elements of any other embodiment disclosed.

What is claimed is:

1. An automatic dispenser for transmission devices for use in a vehicle, the automatic dispenser comprising:
 a storage space for the transmission devices;
 an interface configured to receive vehicle information;
 a processing apparatus configured to determine a suitable transmission device from the stored transmission devices based on the received vehicle information;
 an actuator in communication with the processing apparatus, the actuator configured to retrieve the suitable transmission device based on the received vehicle information;
 a module for programming the suitable transmission device based on the received vehicle information; and
 a delivery tray configured to dispense the programmed suitable transmission device.

2. The automatic dispenser of claim 1, further comprising:
 an electromagnetically shielded cavity operable to temporarily store the retrieved transmission device, the shielded cavity in signal communication with the programming module, the programming module configured to program the retrieved transmission device temporarily stored in the shielded cavity.

3. The automatic dispenser of claim 2, wherein the processing apparatus further comprises:
 a processor;
 a memory data storage device;
 a controller;
 a receiver; and
 a transmitter.

4. The automatic dispenser of claim 3, wherein the processing apparatus further comprises an information database stored in the memory data storage device, the information database comprising a database of transmission device types and associated transmission device protocols, the processing apparatus configured to determine the transmission device protocol based on the received vehicle information, wherein the programming module is configured to program the retrieved and suitable transmission device with the determined transmission device protocol based on the received vehicle information, the memory data storage device in communication with the processor and the programming module.

5. The automatic dispenser of claim 1, further comprising:
 a reading module configured to read a unique identification (ID) of the transmission devices.

6. The automatic dispenser of claim 1 wherein the interface further comprises a human-machine interface, the human-machine interface further comprising at least one of:
 a card reader;
 a keyboard; or
 an optical reader.

7. The automatic dispenser of claim 1, further comprising:
 an accessory storage space operable to store accessories related to the transmission devices and selectively dispense the stored accessories.

8. The automatic dispenser of claim 1, further comprising an onboard communication module operable to receive at least one of the vehicle information or transmission device information from a vehicle onboard diagnostic device (OBD) or electronic control unit (ECU), the communication module is in communication with the processing apparatus that is configured to determine the suitable transmission device based on the received at least one of the vehicle information or the transmission device information.

9. The automatic dispenser of claim 8, further comprising an OBD dongle selectively connected to an OBD port of the vehicle, the OBD dongle is configured to receive the at least one of the vehicle information or the transmission device information and to transmit the received at least one of the vehicle information or the transmission device information to the communication module.

10. The automatic dispenser of claim 1, wherein the transmission devices are tire pressure monitoring system (TPMS) tire sensors, the sensors operable to monitor air pressure in a vehicle tire.

11. The automatic dispenser of claim 10, wherein the module for programming the transmission devices is operable to clone the TPMS tire sensor prior to dispensing.

12. The automatic dispensing device of claim 11, wherein the TPMS tire sensors include a TPMS tire sensor to be replaced, the processing apparatus is configured to receive information for the TPMS tire sensor to be replaced, the processing apparatus is configured to store the received information for the TPMS sensor to be replaced, and the programming module is configured to clone the TPMS tire sensor to be replaced by programming the determined suitable TPMS tire sensor based on the received information for the TPMS tire sensor to be replaced.

13. The automatic dispensing device of claim 12, wherein the processing apparatus further comprises a reading module configured to optically scan the TPMS tire sensor to be replaced to receive the information for the TPMS tire sensor to be replaced.

14. The automatic dispensing device of claim 12, further comprising an optical scanner configured to optically scan the TPMS tire sensor to be replaced to receive the information for the TPMS tire sensor to be replaced.

15. The automatic dispensing device of claim 1, wherein the transmission devices comprise a plurality of different transmission devices configured for different vehicles, and wherein the determined suitable transmission device is based on the received vehicle information.

16. A method for dispensing a transmission device by an automatic dispensing device storing a plurality of transmission devices in respective of a plurality of storage bays, the method comprising:
receiving vehicle information;
determining a suitable transmission device type based on the received vehicle information;
determining a transmission device protocol based on the received vehicle information;
retrieving one of the suitable transmission devices from the plurality of transmission devices from a respective one of the plurality of storage bays of the automatic dispensing device based on at least one of the determined transmission device type and the determined transmission device protocol;
placing the retrieved suitable transmission device in a shielded cavity;
transmitting a signal into the shielded cavity to program the suitable transmission device; and
dispensing the programmed suitable transmission device.

17. The method of claim 16, wherein retrieving the suitable transmission device from the respective storage bay includes controlling an actuator including at least one of a chute, a conveyor system, or a robotic arm.

18. The method of claim 16, wherein transmitting the signal further comprises transmitting an electromagnetic wave in at least one of a frequency of approximately 125 KHz or between 315 MHz and 434 MHz.

19. The method of claim 16, wherein a processing apparatus stores a database of the transmission device protocols, wherein the signal transmitted into the shielded cavity to program the suitable transmission device comprises the determined transmission device protocol.

20. An automatic dispenser for use in storing and selectively dispensing a plurality of different tire pressure monitoring system (TPMS) tire sensors configured for different vehicles, the dispenser comprising:
a plurality of storage bays operable to temporarily store a predetermined type of the plurality of tire sensors;
an electromagnetically shielded cavity in communication with the plurality of storage bays;
a processing apparatus comprising:
a processor; and
a memory data storage device including an information database of tire sensor types and tire sensor communication protocols;
a receiver;
a transmitter; and
a human machine interface operable to receive at least one of vehicle information or tire sensor information;
a reading module operable to individually read indicia of the plurality of tire sensors, the processing apparatus configured to determine a suitable tire sensor based on the received at least one of vehicle information or tire sensor information;
an actuator operable to engage a predetermined one of the suitable tire sensor from a predetermined one of the plurality of storage bays housing the suitable tire sensor and transfer the suitable tire sensor to the shielded cavity;
a programming module operable to program a suitable tire sensor positioned in the shielded cavity, the programming module operable to transmit a data signal including a tire sensor protocol into the shielded cavity to program the suitable tire sensor; and
a delivery tray in communication with the shielded cavity operable to receive the programmed suitable tire sensor and allow access to a user to remove the programmed suitable tire sensor from the automatic dispenser.

* * * * *